Oct. 28, 1941.   F. M. O'BRIEN   2,260,724
FRUIT CLIPPER
Filed Aug. 25, 1939
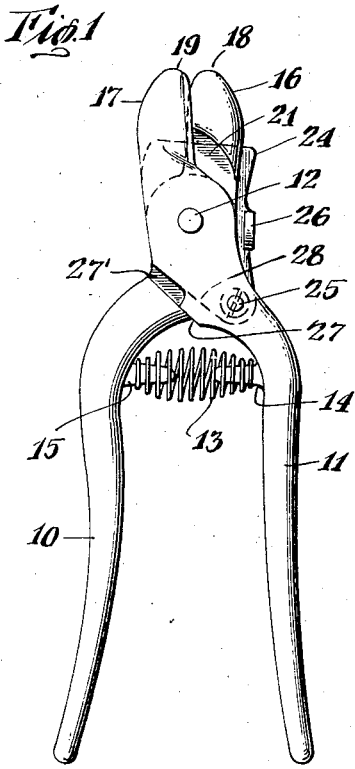
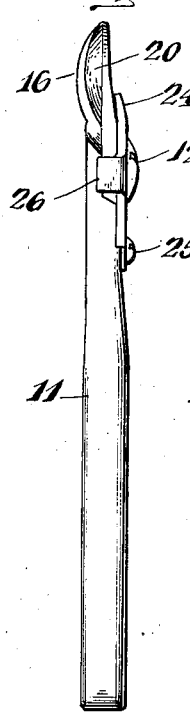
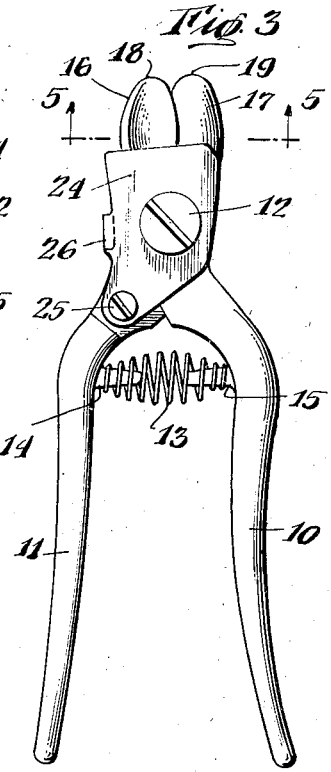
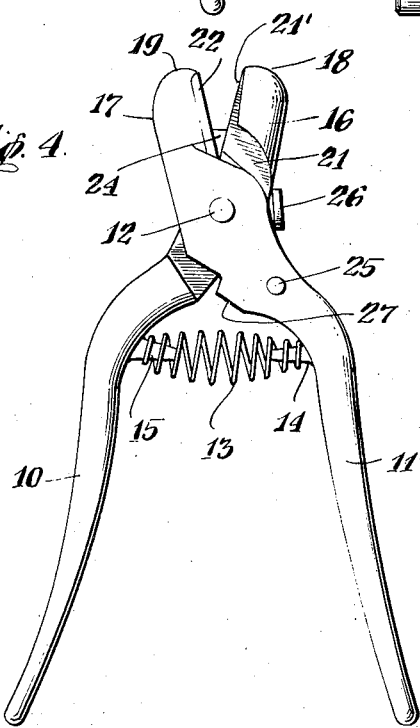
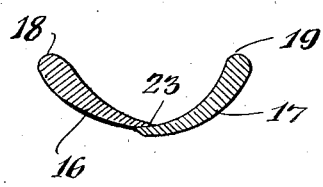
INVENTOR
Frank M. O'Brien
BY
ATTORNEY Patented Oct. 28, 1941

2,260,724

UNITED STATES PATENT OFFICE 2,260,724

FRUIT CLIPPER

Frank M. O'Brien, St. Petersburg, Fla.

Application August 25, 1939, Serial No. 291,811

2 Claims. (Cl. 30—244)

My invention relates to a novel and improved fruit clipper, and it is the principal object of the invention to provide a clipper producing a shear cut severing the fruit stem without danger to fruit and twig from which it is separated.

The known devices of this type cut with a nipper action, the same as for instance a pair of pliers or nail nippers, squeezing or nipping off the fruit stem and leaving bruised ends on the stem attached to the fruit as well as the attached twig remaining on the tree.

All these disadvantages are overcome or avoided by the use of my novel clipper which produces a shear cut by one blade passing the other.

Another object of my invention is the provision of a fruit clipper of this character, the blades of which are ground at an angle making the clipper self-sharpening during the picking process.

Still another object of my invention is the provision of a fruit clipper making the operation thereof easier than heretofore, and producing a clean, sharp shear action which severs the fruit stem without damage.

A further object of my invention is the provision of a fruit clipper in which the cutting surface of the blades does not extend to the extreme surface of the blades and the ends of the blades are rounded to prevent clipper cuts or injury to the fruit skin during the picking operation.

A still further object of my invention is the provision of a fruit clipper having a guard which acts as a bearing surface for the top blade and handle and presents a positive, rigid, box-type bearing with a stop which prevents the clipper from opening too far during the picking process.

Other advantages of my fruit clipper reside in its construction so as to allow its re-adjustment after excessive wear on the blades by cutting away a small part of the stock adjacent to the screw of the guide stop on the reverse side of the clipper, and in the making of the left handle of the clipper practically straight, while the opposite handle part is curved to fit the hand of the operator, making the clipper more efficient, as it is easier to operate than when both handles are curved, as in most of the known devices of this type.

These and other objects and advantages of my invention will become more fully known as the description thereof proceeds, and will then be more specifically defined in the appended claims.

In the accompanying drawing forming a material part of this disclosure:

Fig. 1 is a front elevation of a clipper constructed according to my invention, in closed position.

Fig. 2 is a side edge view of the same.

Fig. 3 is a rear view of the fruit clipper.

Fig. 4 is a view similar to Figure 1 with the clipper in open position.

Fig. 5 is a cross-section on line 5—5 of Figure 3.

As illustrated, the fruit clipper according to my invention embodies the two handle parts or shanks 10 and 11 which are pivotally connected intermediate their ends by a center punched screw bolt 12. One of the handles, for instance the handle 10, is substantially curved so as to snugly fit the hand or fingers of the operator, while the other handle, 11, is substantially straight to snugly rest in the palm of the operator. A coiled spring 13 is interposed between the handle parts to normally keep the handles apart. The ends of the spring are wound about suitable, oppositely disposed, projections or studs 14, 15 on the inner edges of the handles.

The outer ends of the handles are shaped to form shear blades 16, 17 having substantially round and blunt tips, as indicated at 18, 19. As shown in Fig. 5, the rear faces of the blades 16, 17 are curved substantially on the arc of a circle with their outer or rear faces convex and their inner or front faces substantially concave as seen at 20 (Fig. 2), and the lower, front portion of the blade 16 is recessed, as at 21 (Fig. 4) to accommodate during the cutting operation the shoulder of the handle 11 below its cutter blade 17. This recessed portion 21 is narrowing towards the outer end 18 of the blade 16 to form a cutting edge 21', while the inner edge of the blade 17 has a bevelled cutting edge 22 cooperating with the edge 21' with a shearing action when the handles are pressed together, as one blade passes the other slightly, as indicated at 23. In fitting the inside blade to the outside blade the grinding must be done back away from the cutting edge as the cutting edge of this blade must be the highest point in relation to the surface of the other, outside blade. While the blade edges must be sharp enough, they must be so arranged relatively to one another as not to damage the fruit skin, and the co-operating shear blades are ground at an angle making the clipper practically self-sharpening during the picking process.

To the rear of the handle 11, a guard or guide 24 is attached by means of a screw 25, such guard acting as a stop guard by means of its flange 26 engaging the edge of the other handle 10 to prevent the clipper from opening too far during the picking operation.

A shoulder part 27 on handle 11 co-operates with a shoulder 27' formed by a cut-away portion on handle 10 to accommodate the blade crossing. By cutting away a small portion of the shank of handle part 11, as for instance indicated at 28 adjacent to screw 25, the clipper can be readjusted if worn by excessive wear on the blades after continuous use.

The use and operation of my fruit clipper will be clearly understood from the above description thereof by simultaneously having reference to the accompanying drawing, and it will be clear that the shearing action of the blades will positively prevent a cutting of the fruit skin and bruising of the stem and twig. The blades are ground at such an angle as to make the clipper practically self-sharpening during the picking operation.

The arrangement of the top guard will prevent the clipper from opening too far during the picking process while ample clearance between the rear of the blades and the top guard will allow the positive operation of the blades and their shearing action. A re-adjustment of the clipper may conveniently be made after continuous use and consequent wear on the blades by simply cutting away a small part of the stock adjacent to the fastening screw of the top guard. Finally the shape of the handles will permit a ready and convenient operation.

It will be understood that I have described and shown the preferred form of my fruit clipper as one example only of the many possible ways to practically construct the same, and that I may make such changes in its general arrangement and in the construction of its minor details as come within the scope of the appended claims without departure from the spirit of my invention and the principles involved.

Having thus described my invention, what I claim as new, and desire to secure by Letters Patent is:

1. In a fruit clipper as described, a pair of handle parts, a pair of co-operating shear blades formed with said handle parts, the inner edges of said shear blades ground at an angle to one another to partly overlap and frictionally engage during the shearing operation to make the same self-sharpening during the repeated shearing operations, a stop guard removably secured to one of said handle parts and spaced from said blades to form a box-like structure protecting the shear blades, a shoulder on one of the handle parts co-operating with a shoulder formed with the other handle part by a cut-away portion to limit the inward movement of the handle parts, said cut-away portion entering during the operation of the clipper said box-like structure, and a flange on said stop guard laterally engaging one of said handle parts to limit the outward movement of the clipper handle parts during operation.

2. A fruit clipper comprising two jaws formed to present shear blades at the outer ends of two pivotally connected crossing handle parts, said blades cooperating to inviolably shear off fruits and stems, one of said blades passing the other slightly, said blades ground at an angle to one another, a stop guard on the pivot point connecting said handle parts, for limiting the outward movement of said handle parts, said guard having its lower end removably secured to one of said handle parts and the wider, upper end thereof providing a box-like structure to protect the shear blades, a flange on said guard to laterally engage one of said handle parts to produce said limiting effect, and shoulders formed on said handle parts by cutting away the material of said parts at oppositely disposed points to limit the inward movement of the handle parts against the action of a spring normally holding said handle parts and shear blades apart.

FRANK M. O'BRIEN.